(12) United States Patent
Kadoi

(10) Patent No.: US 6,708,669 B2
(45) Date of Patent: Mar. 23, 2004

(54) ENGINE CONTROL APPARATUS FOR A VEHICLE

(75) Inventor: Masaru Kadoi, Anjyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,828

(22) Filed: Oct. 10, 2002

(65) Prior Publication Data

US 2003/0079718 A1 May 1, 2003

(30) Foreign Application Priority Data

Oct. 10, 2001 (JP) .................................... 2001-312706

(51) Int. Cl.$^7$ .............................................. F02D 41/04
(52) U.S. Cl. .................................. 123/339.17; 62/228.3
(58) Field of Search ........................ 123/339.17; 62/228.3

(56) References Cited

U.S. PATENT DOCUMENTS

| 5,285,649 A | * | 2/1994 | Yamanaka et al. | ............. 62/133 |
| 5,385,029 A | * | 1/1995 | Yamanaka et al. | ............. 62/133 |
| 5,924,296 A | * | 7/1999 | Takano et al. | ......... 123/339.17 |
| 6,035,652 A | | 3/2000 | Hashimoto | |
| 6,553,775 B2 | * | 4/2003 | Togaru et al. | ......... 123/339.17 |

FOREIGN PATENT DOCUMENTS

| JP | 2635379 B2 | 4/1997 |
| JP | 10-141107 A | 5/1998 |

* cited by examiner

Primary Examiner—Erick Solis
(74) Attorney, Agent, or Firm—Birch, Stewart, Kolasch & Birch, LLP

(57) ABSTRACT

An engine control apparatus reduces a driver's feeling of wrongness in a vehicle equipped with an air-conditioning apparatus. A larger one of a first load torque estimated value obtained by estimating a compressor load torque of the air conditioner based on a refrigerant pressure, and a second load torque estimated value obtained by estimating a load torque of the compressor based on an outside air temperature is selected as an air conditioner load to an engine control unit, and an engine output is corrected by using the air conditioner load.

10 Claims, 3 Drawing Sheets

ENGINE CONTROL APPARATUS FOR A VEHICLE

BACKGROUND OF THE INVENTION

This non-provisional application claims priority under 35 U.S.C. §109(a) on patent application No. 2001-312706 filed in Japan on Oct. 10, 2001, which is herein incorporated by reference.

1. Field of the Invention

The present invention relates to an engine control apparatus for a vehicle equipped with an air-conditioning apparatus.

2. Description of the Related Art

In a vehicle equipped with an air-conditioning apparatus (hereinafter, "air conditioner"), since an engine drives not only wheels but also a compressor for compressing an air-conditioning refrigerant, a load torque of the compressor acts on the engine. The magnitude of the load torque of the compressor acting on the engine is changed in accordance with an environment (outside air temperature, etc.) in which the air conditioner is used, a passenger's demand for the air conditioner, and the like during driving of a vehicle.

When the vehicle is driven, a driver operates an accelerator pedal and transmits a demand for a forward/reverse movement of the vehicle to the vehicle. The engine for driving the wheels is controlled in accordance with the amount of operation of the accelerator pedal, and the vehicle responds to the demand of the driver.

Accordingly, when the compressor load is abruptly applied to the engine by turning ON the air conditioner during the traveling of the vehicle, a torque transmitted to the wheels is changed irrespective of an intention of the driver. This gives the driver, a feeling of wrongness (uncomfortableness).

When the vehicle is standing, a feedback control is carried out so that the engine speed is controlled to match a previously set objective idling engine speed. Also here, however, when the compressor load being applied to the engine is abruptly changed, the engine speed is abruptly changed. This causes a delay in response in the feedback control, the engine speed is temporarily changed, and, as a result, a feeling of wrongness is given to the driver.

SUMMARY OF THE INVENTION

In view of the above problem, an object of the invention is to provide an engine control apparatus, which can reduce the foregoing driver's feeling of wrongness in a vehicle equipped with an air-conditioning apparatus.

According to the invention, a larger one of air conditioner loads derived from an outside air temperature and a refrigerant pressure is used as an air conditioner load, and the accuracy of air conditioner load estimation, at the time of an operation start of an air conditioner compressor, is improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
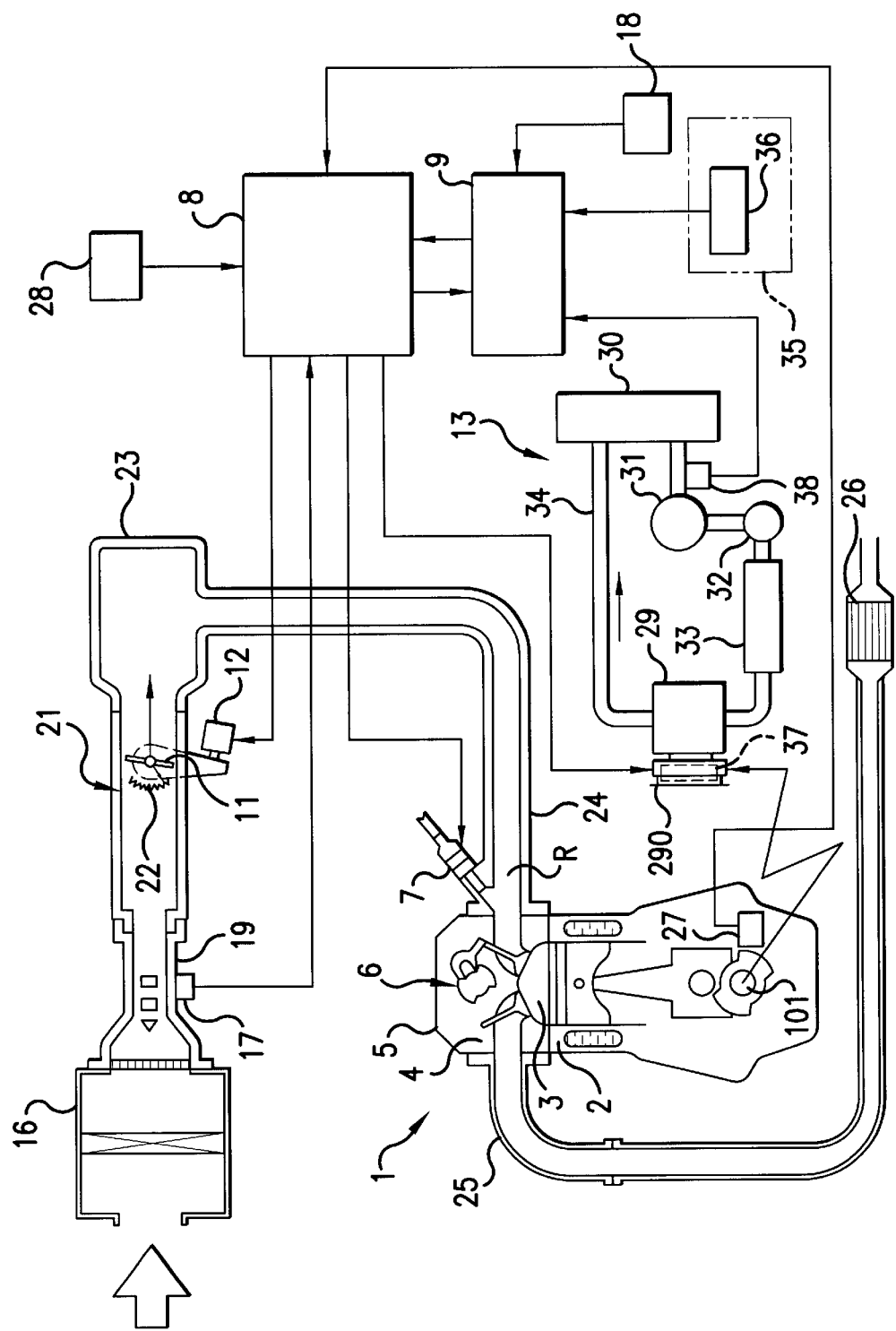
FIG. 1 is a schematic structural view of a vehicle equipped with an engine control apparatus according to a preferred embodiment of the present invention.
Figure 2:
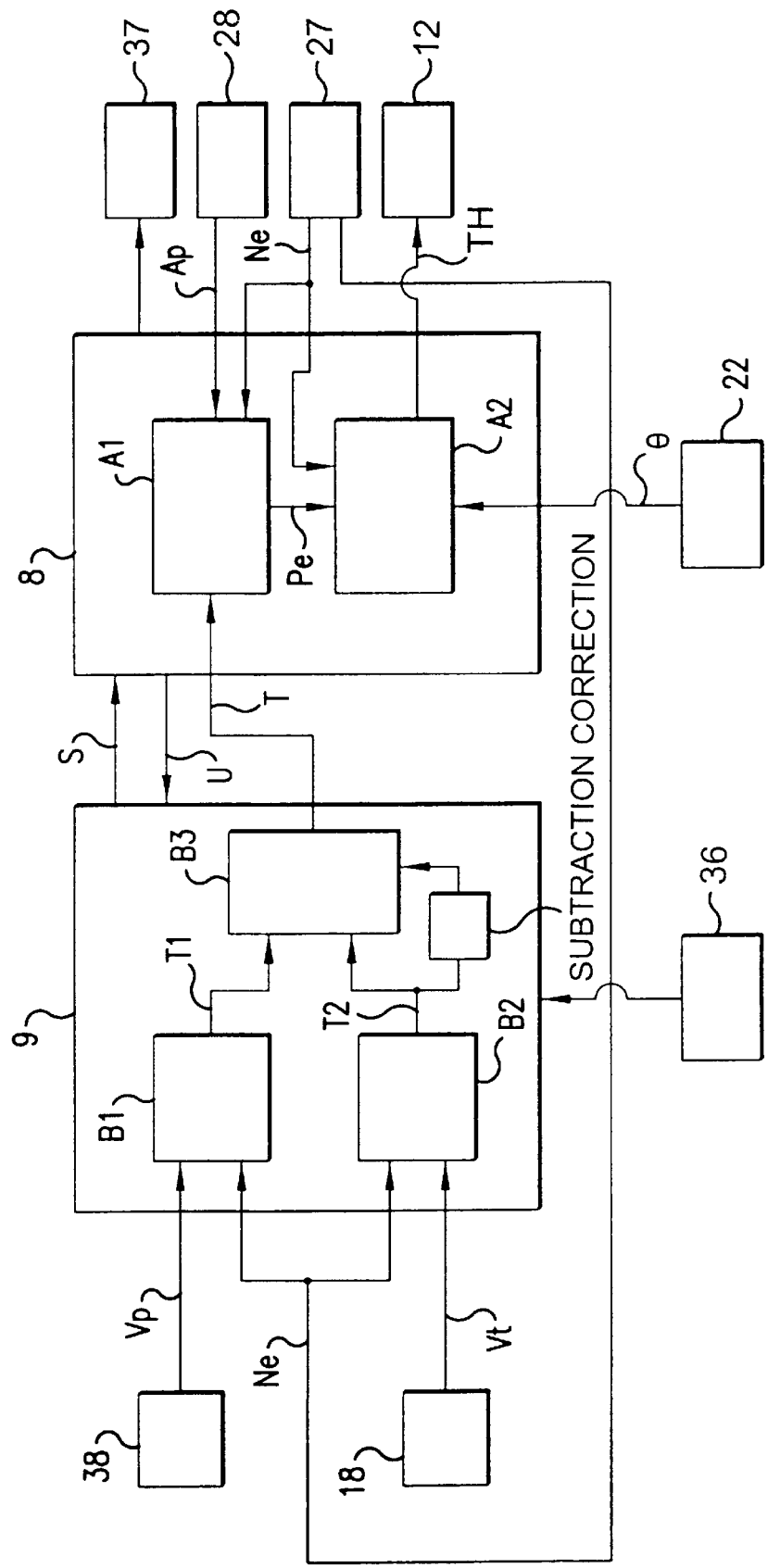
FIG. 2 is a block diagram showing control of an engine ECU 8 and an air conditioner ECU 9.
Figure 3:
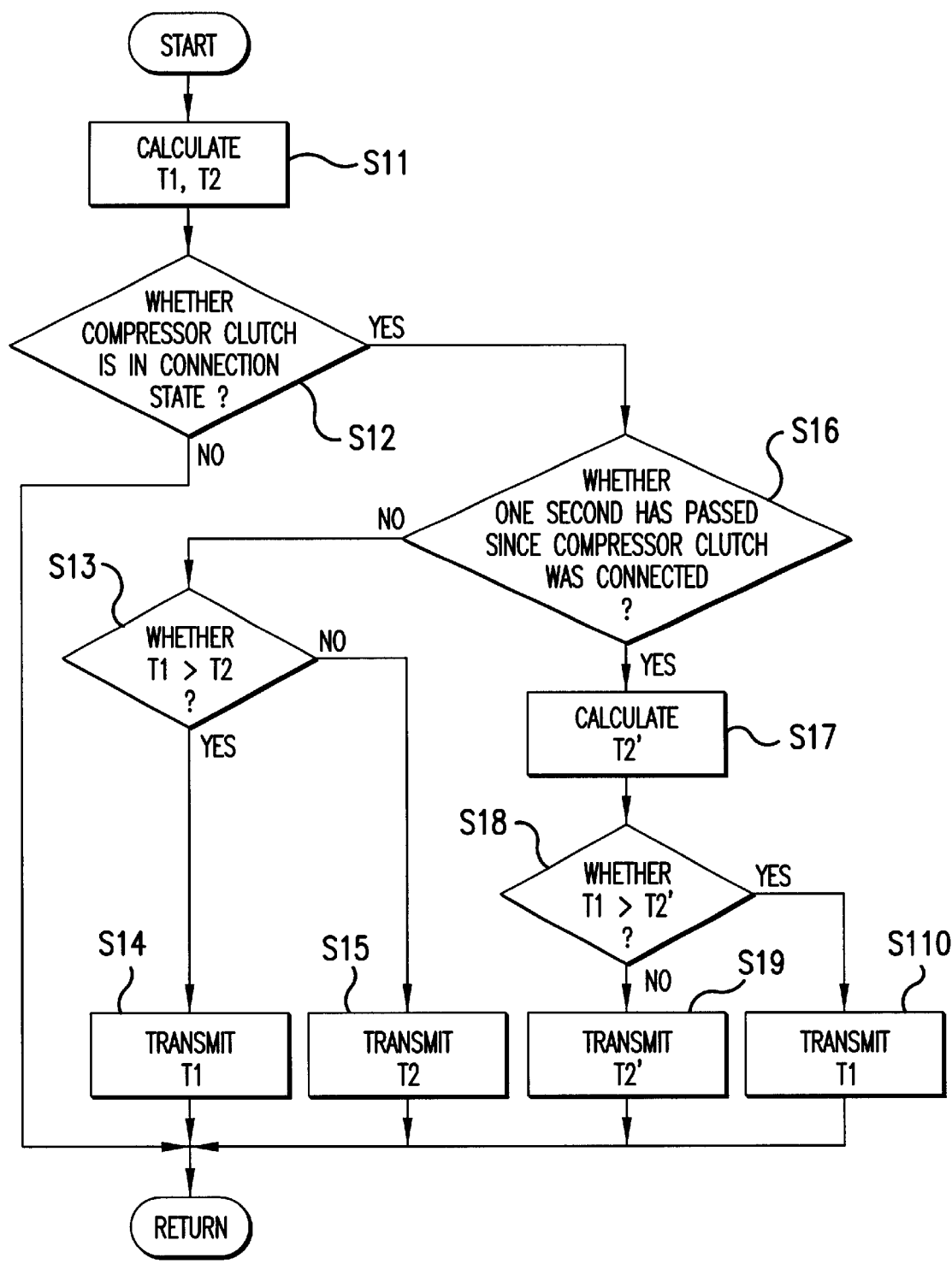
FIG. 3 is a flowchart of an estimation routine of load torque of a compressor carried out by an air conditioner ECU.

FIGS. 1 through 3 show a four-cycle gasoline engine (hereinafter, referred to as an engine) 1 as an example of an engine of a vehicle to which the present invention is applied. In FIG. 1, the engine 1 is provided with a plurality of combustion chambers (only one of which is shown in FIG. 1) 3 therein, and includes a valve system 6 inside a cylinder head 4 and a locker cover 5. Reference numeral 2 designates a cylinder block. Fuel injected by an injector 7 is supplied into the combustion chamber 3 through an intake passage R, and is ignited by an ignition plug not shown. The injector 7 and the ignition plug are controlled by an engine ECU 8, as electronic control means of the engine. An air conditioner ECU 9, as electronic control means, at the side of an air-conditioning apparatus 13 is connected to the engine ECU 8. Incidentally, both the engine ECU 8 and the air conditioner ECU 8 are connected by a communication line such that sending and receiving of signals between both the ECUs can be always performed.

The engine 1 intakes air from an air cleaner 16, and a suction air amount, measured by an air flow sensor 17, is input to the engine ECU 8. Further, an engine rotation sensor 27 detects an engine speed Ne, and inputs a detected value to the engine ECU 8. Then, the engine ECU 8 obtains a suction air amount per combustion cycle by dividing the measured suction air amount by the engine speed Ne.

The engine ECU 8 determines an injection amount of fuel to be injected by the injector 7 in accordance with the thus obtained suction air amount per combustion cycle. The suction air flows into an intake manifold 24 after passing through the air cleaner 16, a throttle body 21, and a surge tank 23, and mixed with the fuel injected from the injector 7. This mixture is ignited in the combustion chamber 3. The ignited mixture explodes and expands inside the combustion chamber 3, and is discharged, as an exhaust gas, into an atmosphere through an exhaust manifold 25 and an exhaust gas purifying device 26. Reference numeral 28 designates an accelerator sensor for detecting an accelerator position.

An output shaft 101 of the engine 1 is connected to a driving system of the vehicle not shown, and transmits torque to the driving system to cause the vehicle to travel. The output shaft 101 of the engine 1 is coupled to an input shaft 290 of a compressor 29 of the air-conditioning apparatus 13 through a belt. The input shaft 290 is provided with a compressor clutch 37 of the compressor 29. This compressor 29 is of a well-known scroll type. The air-conditioning apparatus 13 includes the compressor 29, a condenser 30, a liquid tank 31, an expansion valve 32, and an evaporator 33, and they are connected by a refrigerant pipe 34. After a refrigerant is compressed by the compressor 29, it is cooled by the condenser 30 through heat exchange to the outside air, and flows into the liquid tank 31. Further, the refrigerant is expanded by the expansion valve 32, cools air sent into a compartment by the evaporator 33, and is again returned to the compressor 29.

A refrigerant pressure sensor 38 for detecting an exit side pressure of the compressor 29 is installed in the vicinity of an exit of the condenser 30. This refrigerant pressure sensor 38 outputs a voltage Vp, which corresponds to the refrigerant pressure, to the air conditioner ECU 9. An outside air temperature sensor 18, attached in the vicinity of a rear side of a front bumper of the vehicle, outputs a voltage Vt, which corresponds to the outside air temperature, to the air conditioner ECU 9. The air conditioner ECU 9 controls the air conditioner in accordance with an on/off signal from an air conditioner switch 36 provided on an air conditioner panel 35, and signals from temperature setting switches, air quantity, blow-off mode, etc, not shown.

The engine 1 is controlled in a manner described below.

The detailed description will be given in conjunction with FIGS. 1 and 2. An objective torque determination unit A1, provided in the engine ECU 8 receives an accelerator pedal operation amount Ap from the accelerator pedal sensor 28, and an engine speed Ne from the engine rotation sensor 27, respectively, and determines a torque to be generated in the output shaft 101. In other words the engine ECU 8 determines an objective torque Pe based on the accelerator pedal operation amount Ap and the engine speed Ne.

A throttle valve control unit A2 provided in the engine ECU 8 receives the objective torque Pe and the engine speed Ne, and controls the position of a throttle valve 11 such that the engine 1 can generate the objective torque Pe. That is, the throttle valve control unit A2 determines an objective throttle opening TH on the basis of the objective torque Pe and the engine speed Ne, drives an actuator (a step motor) 12 to achieve the objective throttle opening TH while referring to an actual opening θ of the throttle valve detected by a throttle position sensor 22, and opens and closes the throttle valve 11. Then, the air flow sensor 17 detects the amount of suction air passing through this controlled throttle valve 11, and the engine ECU 8 determines a supply amount of fuel and causes the fuel to be injected from the injector 7.

The air conditioner ECU 9 makes a determination to connect the compressor clutch 37 when the air conditioner switch 36 is turned on, and transmits this determination result as a disconnection/connection instruction S to the engine ECU 8. In accordance with the disconnection/connection instruction S, the engine ECU 8 connects the compressor clutch 37, and transmits a disconnection/connection signal U, indicative of a disconnection/connection state and possessed by the engine ECU 8, to the air conditioner ECU 9. When the air conditioner switch 36 is turned off, the engine ECU 8 disconnects the compressor clutch 37.

The air conditioner ECU 9 includes a first load torque estimation unit B1, a second load torque estimation unit B2, and a load torque selection unit B3. The first load torque estimation unit B1 calculates a load torque applied to the engine by the compressor 29 as a first load torque estimated value T1 (T1=f1(Vp, Ne)) based on the output value Vp of the refrigerant pressure sensor 38 and the engine speed Ne. The second load torque estimation unit B2 calculates a load torque applied to the engine by the compressor 29 as a second load torque estimated value T2 (T2=f2(Vt, Ne)) based on the voltage value Vt of the outside air temperature sensor 18 and the engine speed Ne. Further, the second load torque estimated value T2 is subjected to a subtraction correction in accordance with an elapsed time from the connection of the compressor clutch 37 in the state where the compressor clutch 37 is connected. Incidentally, the disconnection/connection state of the compressor clutch 37 is judged from the disconnection/connection signal U received from the engine ECU 8.

A process of obtaining the estimated load torque T will be described in conjunction with the flowchart shown in FIG. 3. When the air conditioner switch 36 is turned on and a load torque estimation routine is started (step s11). At step s11, the first load torque estimation unit B1 calculates the first load torque estimated value T1, the second load torque estimation unit B2 calculates the second load torque estimated value T2, and the procedure proceeds to step s12.

At step s12, whether or not the compressor clutch is in the connection state is judged from the disconnection/connection signal U. If the clutch is in the connected state, the procedure proceeds to step s16, and if the clutch is in the disconnected state, the load torque selection unit B3 does not output a load torque signal to the engine ECU 8, and the process is reset.

In the case where the process proceeds to step s16 from step s12, it is judged whether or not a predetermined time (for example, one second) has passed since the compressor clutch was connected from a count value of a timer Tim. The timer Tim starts to count when the compressor clutch is connected and operated, and is reset when the compressor clutch is disconnected. In the case where the predetermined time has passed, the process proceeds to step s17, and if not, the process proceeds to step s13.

When the process reaches step s13, it is judged whether or not the first load torque estimated value T1 is larger than the second load torque estimated value T2. When the first load torque estimated value T1 is larger, the process proceeds to step s14 and the load torque selection unit B3 transmits the first load torque estimated value T1 as the estimated load torque T to the engine ECU 8. When the second load torque estimated value T2 is larger, the process proceeds to step 215, and the load torque selection unit transmits the second load torque estimated value T2 as the estimated load torque T to the engine ECU 8.

When the process reaches step s17, the subtraction correction is applied to the second load torque estimated value T2 according to the following equation, and the process proceeds to step s18.

$$T2'=f3(T2, Tim)$$

At step s18, the load torque selection unit B3 judges whether or not the first load torque estimated value T1 is larger than the corrected second load torque estimated value T2'. When the corrected second load torque estimated value T2' is larger, the process proceeds to step s19, the corrected second load torque estimated value T2' is transmitted as the estimated load torque T to the engine ECU 8, and the process is reset. In the case where the first load torque estimated value T1 is larger, the process proceeds to step s110, and the first load torque estimated value T1 is transmitted as the estimated load torque T to the engine ECU 8.

The air conditioner ECU 9 obtains the estimated load torque T in the manner described above, and transmits it to the engine ECU 8. The engine ECU 8 uses this estimated load torque to control the engine such that the output of the engine 1 becomes suitable.

Next, the control of the engine 1 during traveling will be described. When the vehicle starts to travel, the engine ECU 8 calculates the objective torque Pe by the objective torque determination unit A1 according to the following equation and based on the accelerator pedal operation amount Ap and the engine speed Ne.

$$Pe=g1(Ap, Ne)$$

The throttle valve control unit A2 calculates the position of the throttle valve 11 from the objective torque Pe and the engine speed Ne according to the following equation so that the engine 1 generates the objective torque Pe.

$$TH=g2(Pe, Ne)$$

Based on this calculation result, the actuator 12 is operated, and the throttle valve 11 is moved to the objective position.

Now, when the air conditioner switch 36 is turned ON at the time when the engine 1 is being controlled in this way, the engine ECU 8 receives the clutch connection instruction S as described above, and at the same time, receives the estimated load torque T from the load torque selection unit B3. The objective torque determination unit A1 corrects the objective torque Pe according to the following equation and based on the objective torque Pe and the estimated load torque T.

$$Pe = g3(Pe, T)$$

The throttle valve control unit A2 obtains the objective throttle opening as described above, and controls the throttle valve actuator 12. Incidentally, since there is a certain time lag t1 from the time when the throttle valve actuator 12 is operated to the time when the suction air having passed through the throttle valve 11 reaches the engine cylinder and is reflected as a change in the output of the engine 1, the clutch connection signal is output to the compressor clutch 37 in view of this time lag t1.

When the connection signal of the compressor clutch 37 is output, the disconnection/connection signal U, indicative of the connecting state, is transmitted to the air conditioner ECU 9.

Incidentally, in the above embodiment, although the second load torque estimated value T2 is obtained by calculation, values previously obtained by experiments can be stored in a memory as a map, and a value may be read out from the map based on the outside air temperature and the engine speed.

As described above, the engine control apparatus controls the engine 1 during traveling so that its output becomes suitable.

That is, since the refrigerant pressure does not become constant for a while from the connection of the compressor clutch 37, and an estimated value is inaccurate in compressor torque estimation based on the refrigerant pressure, even if the engine output is corrected and controlled based on the estimated value, the vehicle accelerates in forward and reverse directions, and thus the ride quality is poor. However, by using larger one of the second load torque estimated value, estimated based on the outer air temperature and the engine speed, and the first torque estimated value, estimated based on the refrigerant pressure and the engine speed, the suitable compressor torque can be estimated, and therefore, the ride quality becomes good.

Incidentally, when the vehicle is standing, the idling engine speed Ne of the engine is stabilized by feedback control, so that the actual engine speed Ne matches a previously set objective speed Nes. When the load torque Tn of the compressor acting on the engine 1 is abruptly changed, the engine speed Ne of the engine 1 is abruptly changed, and a response is delayed if the feedback control is used. Therefore, at this time, a feed forward control is carried out, in which an actuator correction amount obtained from the estimated load torque T is added to position data of the actuator 12 obtained from the feedback control value, to obtain an objective position of the actuator 12. By this feed forward control, the output control of the engine is quickly carried out, and a feeling of wrongness is not given to the driver.

Although the embodiment of the invention has been described in detail, the invention is not limited to the foregoing embodiment, and it can be modified within the range of the gist of the invention and can be carried out.

What is claimed is:

1. An engine control apparatus of a vehicle, comprising:
   an engine;
   an engine rotation sensor that detects an engine speed;
   an outside air temperature sensor that detects an outside air temperature;
   an engine control unit controlling the engine based on a driving state of the vehicle;
   an air conditioner compressor driven by the engine;
   an air conditioner condenser that cools a refrigerant pressurized by the air conditioner compressor;
   a refrigerant pressure sensor that detects a pressure of the refrigerant; and
   an air conditioner control unit having,
   a first load torque estimation unit that estimates a first load torque value of the compressor based on an output from the refrigerant pressure sensor,
   a second load torque estimation unit that estimates a second load torque value of the compressor based on the detected outside air temperature and the detected engine speed, and
   an estimated load torque selection unit that compares the first load torque value estimated by the first load torque estimation unit with the second load torque value estimated by the second load torque estimation unit to transmit a larger one of the first load torque value and the second load torque value to the engine control means.

2. A vehicle engine control apparatus according to claim 1, further comprising:
   a accelerator sensor that detects an accelerator pedal position,
   wherein the engine control unit calculates a required torque from the detected accelerator pedal position and the detected engine speed to control the engine.

3. A vehicle engine control apparatus according to claim 2, wherein the engine control unit corrects the required torque, calculated from the detected accelerator pedal position and the detected engine speed, by the larger one of the first estimated load torque value and the second estimated load torque value transmitted from the estimated load torque selection unit.

4. A vehicle engine control apparatus according to claim 2, wherein the engine control unit controls a throttle valve position based on the required torque.

5. A vehicle engine control apparatus according to claim 3, wherein the engine control unit controls a throttle valve position based on the corrected required torque.

6. A vehicle engine control apparatus according to claim 1 or 4, wherein the first load torque estimation unit estimates the first load torque value of the compressor based on the detected refrigerant pressure and the detected engine speed.

7. A vehicle engine control apparatus according to claim 2, wherein the engine control unit controls a throttle valve position based on the required torque, and corrects the throttle valve position by a correction amount calculated based on the larger one of the first estimated load torque value and the second estimated load torque value transmitted from the estimated load torque selection unit.

8. A vehicle engine control apparatus, according to claim 1, wherein the estimated second load torque value is corrected based on an elapsed time from an activation of the air conditioner compressor.

9. A vehicle engine control apparatus according to claim 8, wherein, after a predetermined time passes since start of an activation of the air conditioner compressor, the estimated load torque selection unit compares the estimated first load torque value with the estimated second load torque value corrected based on the elapsed time to transmit a large one of the first load torque value and the second load torque value.

10. A vehicle engine control apparatus according to claim 1, wherein the first load torque estimation unit estimates the first load torque value of the compressor based on an output from the refrigerant pressure sensor and an output from the engine rotation sensor.

* * * * *